(12) United States Patent
Yoshida et al.

(10) Patent No.: US 7,765,285 B2
(45) Date of Patent: Jul. 27, 2010

(54) MAIL SERVER, ELECTRONIC MAIL TRANSMISSION CONTROL METHOD FOR THE MAIL SERVER, AND ELECTRONIC MAIL SYSTEM

(75) Inventors: Takeo Yoshida, Nakano-ku (JP); Naoki Yamada, Nakano-ku (JP); Fumio Kitagawa, Nakano-ku (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1922 days.

(21) Appl. No.: 10/224,396

(22) Filed: Aug. 21, 2002

(65) Prior Publication Data

US 2003/0126259 A1 Jul. 3, 2003

(30) Foreign Application Priority Data

Dec. 27, 2001 (JP) ............................ 2001-398336

(51) Int. Cl.
  *G06F 15/173* (2006.01)
(52) U.S. Cl. ..................... 709/223; 709/206; 709/225; 709/229
(58) Field of Classification Search ................ 709/225, 709/229, 206, 223
  See application file for complete search history.

(56) References Cited

U.S. PATENT DOCUMENTS

| | | | | |
|---|---|---|---|---|
| 6,000,033 A | * | 12/1999 | Kelley et al. .................... | 726/8 |
| 6,137,597 A | * | 10/2000 | Kanaya ........................ | 358/402 |
| 2001/0037316 A1 | * | 11/2001 | Shiloh ......................... | 705/74 |
| 2002/0010635 A1 | * | 1/2002 | Tokiwa ........................ | 705/26 |

FOREIGN PATENT DOCUMENTS

| | | |
|---|---|---|
| JP | 11-127190 | 5/1999 |
| JP | A 2001-160822 | 6/2001 |
| KR | 2000-0063974 | 11/2000 |
| KR | 2001-0103816 | 11/2001 |

OTHER PUBLICATIONS

Hiroo Shirasaki, "How to Make Firewall (19)", UNIX Magazine, Jun. 1, 1999, vol. 14, No. 6, p. 44-19 with English-language translation of relevant portions.

(Continued)

*Primary Examiner*—John Follansbee
*Assistant Examiner*—Glenford Madamba
(74) *Attorney, Agent, or Firm*—Oliff & Berridge, PLC

(57) ABSTRACT

In order to simplify prevention of unauthorized or malicious electronic mail transmission, a mail server comprises a password conversion table which shows registered correlation among user ID, a formal password, and a virtual password different from the formal password, both assigned to each user for user authentication by a general-purpose mail server. A user is informed of only a virtual password. When electronic mail having a virtual password and addressed to an outsider of a company is sent from a client PC, a password conversion processor converts the virtual password into a corresponding formal password with reference to the password conversion table, and the virtual SMTP server function processor sends the electronic mail now having the formal password to the general-purpose mail server. A user at a client PC cannot access the general-purpose mail server using a virtual password as the user is not authenticated using the virtual password.

20 Claims, 5 Drawing Sheets

OTHER PUBLICATIONS

Koji Hiramoto, "Basics of Network", No. 8, Nikkei Linux, Nov. 8, 2001, vol. 3, No. 11, p. 113-122 with English-language translation of relevant portions.

Gakuya Takada, "Mail Filtering Software; Significantly Differing Degree of Freedom of Setting; Start of Handling of Encrypted Mail", Nikkei Communications, Sep. 20, 1999, No. 302, p. 121-127 with English-language translation of relevant portions.

Second Section, "New Tides in Firewall; New Style to Individually Protecting Machines; Products Introduced also in Japanese Market", Nikkei Internet Technology, Jul. 22, 2001, vol. 49, p. 39-47 with English-language translation of relevant portions.

* cited by examiner

MAIL SERVER, ELECTRONIC MAIL TRANSMISSION CONTROL METHOD FOR THE MAIL SERVER, AND ELECTRONIC MAIL SYSTEM

BACKGROUND OF THE INVENTION

1. Field of the Invention

The present invention relates to an electronic mail system, and in particular to an electronic mail system which is suitable for use by small companies with limited financial resources. Specifically, the electronic mail system considers a user's convenience and facilitates security reinforcement and electronic mail management according to operation rules at moderate cost.

2. Description of the Related Art

Along with the recent, remarkable development of the Internet, electronic mail has come to be easily utilized at moderate cost not only by large companies but also small companies, SOHOs, and even individuals. Parties without their own mail servers, such as individuals, small companies, and so forth, can use mail servers offered by Internet providers to exchange electronic mail with outside parties.

A mail server computer having a message transmission and reception function, a mailbox function, a message management function, and so forth is necessary for an electronic mail system. Most mail servers require a password for user authentication. Here, a general mail server constitutes of a mail transfer server (an SMTP server) for electronic mail transmission based on Simple Mail Transfer Protocol, or SMTP, and a mail receiving server (a POP server) for electronic mail receiving based on Post Office Protocol. As SMTP does not have a user authentication function, as does POP, it is possible to arrange such that transmission of electronic mail is allowed only after completion of user authentication through a POP authentication function ("POP before SMTP").

A mail server can provide a mailbox for each user so that each user can access his mailbox at desired timing to retrieve therefrom mail data addressed to them. Recently, free mail service is offered in many sites, and one user may have two or more mailboxes. That is, one user may utilize two or more mail servers and use different mailboxes for different purposes, enabling effective use of electronic mail. Generally, each mailbox can be set with a password, and a user is allowed to access mail data in his mailbox after user authentication based on the password by the concerned mail server.

As described above, a user of a client computer having an electronic mail function and connected to an intra-company LAN is allowed to exchange electronic mail with a party outside the company (an outsider) after completion of user authentication by a mail server. Under such condition, inappropriate network administration, in particular, in view of security and account management for an electronic mail system, may permit electronic mail transmission for unauthorized or malicious purposes without difficulty.

For example, suppose that an unauthorized user creates a user account and a password to access a mail server, sends confidential information to an outsider, and deletes the account. Generally, this unauthorized user who leaked the confidential information cannot be identified. Further, an unauthorized user can illegally access a mail server from outside the company using an account and password which are assigned originally for business use. Still further, where a mailing list is generally transmissible as an attached file, such electronic mail transmission, that is, electronic mail transmission enormous data volume may not be a normal business procedure, if not for an unauthorized purpose, and permission without restriction of such electronic mail transmission may result in an increase in the network load, which could adversely affect use of the network by others. Still further, the company system must be protected from virus attacks not only from inside but also from outside the company.

In short, imposition of no restriction or condition on use of an electronic mail system puts the system at risk of being used for an unauthorized, malicious, or undesirable purpose, or even rejected by an attack from outside. Therefore, it is desirable to manage operation of such an electronic mail system through network observation, security control, and capacity planning accompanied by, for example, placing some restrictions on its use.

In order to address the above described problems with electronic mail systems, large companies may be able to afford sufficient monetary resources to take measures for system security by network specialists, to construct a required system, to employ a full time network administrator, and so forth.

Small companies, however, are unlikely to be able to afford security management or employment of network specialists, and may often have little knowledge about construction of system environment to prevent unauthorized or malicious use of electronic mail. In addition, users owning multiple mailboxes often find it troublesome to retrieve data from all of his mailboxes because such a user is required to input their ID and password for each mailbox and to separately retrieve mail data from each individual mailbox.

SUMMARY OF THE INVENTION

The present invention has been conceived in order to solve these problems, and aims to provide a mail server, an electronic mail communication control method for the mail server, and an electronic mail system, more convenient to a user using a plurality of mail servers.

The present invention also aims to provide a mail server, an electronic mail communication control method for use in the mail server, and an electronic mail system, all of which can readily facilitate stronger security management using a simple structure.

In order to achieve the above mentioned objects, there is provided a mail server, comprising: a password correspondence table showing registered correlation between identification information assigned to a user of a client computer and a password assigned to the user for user authentication by another mail server on which the user has a mailbox; mail receiving request receiving means for receiving a mail receiving request sent from a client computer; mail receiving request generating means for specifying, upon receipt of a mail receiving request by the mail receiving request receiving means, another mail server on which a user having sent the received mail receiving request has a mailbox, with reference to the password correspondence table to generate a mail receiving request relative to the other mail server on behalf of the user; mail receiving request transmitting means for sending the mail receiving request generated by the mail receiving request generating means to the other mail server; mail data receiving means for receiving mail data which is sent in response to the mail receiving request sent by the mail receiving request transmitting means; and mail data transmitting means for adding the mail data received by the mail data receiving means to mail data retrieved from a mailbox possessed by itself to send resultant mail data to the client computer.

In one embodiment of the present invention, the mail receiving request generating means may add the user's password to the mail receiving request to be generated.

Further, the mail server according may further comprise a password conversion table for showing registered correlation among identification information assigned to a user of the client computer installed in a company where the mail server is installed, a formal password assigned to each user for user authentication by the other mail server, and a virtual password different from the formal password and assigned to each user; mail server function means for relaying an access request relative to the other mail server, sent from the client computer; and password conversion means for converting a virtual password set on the access request received by the mail server function means into a formal password with reference to the password conversion table, wherein the mail server function means replaces the virtual password set on the received access request with the formal password into which the virtual password is converted by the password conversion processing means, and then sends the resultant access request to the other mail server.

Still further, the mail server function means may apply, when relaying electronic mail from the client computer to the mail server other than itself, user authentication relative to the mail server other than itself, using the formal password into which the virtual password is converted by the password conversion processing means.

Yet further, the mail server function means may send electronic mail which is addressed solely to an insider of the company to its designated transmission destination as the electronic mail remains having the virtual password, without relaying to the other mail server.

Yet further, the mail server may further comprise a rule database storing a rule concerning relationship between transmission destination to be designated in electronic mail and attribute of a user to be designated as transmission destination of electronic mail; electronic mail checking means for checking if a transmission destination designated in electronic mail sent from the client computer is in compliance with the rule stored in the rule database; and electronic mail transmitting means for sending the electronic mail from the client computer in accordance with a result of the check by the electronic mail checking means.

Yet further, the rule database may store a rule concerning an attached file, and the electronic mail checking means may check if an attached file of electronic mail from the client computer is in compliance with the rule stored in the rule database.

According to another aspect of the present invention, there is provided an electronic mail transmission control method for a mail server, comprising: a mail receiving request receiving step of receiving a mail receiving request sent from a client computer; a mail receiving request generating step of specifying another mail server at which a user having sent the received mail receiving request has a mailbox, with reference to the password correspondence table which shows registered correlation between identification information assigned to a user of a client computer and a password assigned to the user for user authentication by the other mail server at which the user has mailboxes, to generate a mail receiving request relative to the other mail server on behalf of the user; a mail receiving request transmitting step of sending the mail receiving request generated at the mail receiving request generating step to the other mail server; a mail data receiving step of receiving mail data which is sent in response to the mail receiving request sent at the mail receiving request transmitting step; and a mail data transmitting step of adding the mail data received at the mail data receiving step to mail data retrieved from a mailbox possessed by the mail server to send resultant mail data to the client computer.

In one embodiment of the present invention, at the mail receiving request generating step, the user's password may be added to the mail receiving request to be generated.

Further, the electronic mail transmission control method for a mail server may further comprise an access request receiving step of receiving an access request which is sent from the client computer installed in a company where the mail server is installed and has a virtual password which is different from a formal password assigned to each user for user authentication by the other mail server; a password conversion step of converting the virtual password set on the received access request into a formal password, based on identification information on a user having sent the access request received at the access request receiving step; and an access request transmitting step of replacing the virtual password set on the access request received at the access request receiving step with the formal password into which the virtual password is converted at the password conversion step, to send the access request, which now has the formal password, to the other mail server.

Still further, at the access request transmitting step, when electronic mail received at the access request receiving step is addressed to an insider of the company, the electronic mail may be sent to its transmission destination as the electronic mail remains having the virtual password, without being sent to the other mail server.

Yet further, the electronic mail transmission control method for a mail server may further comprise an electronic mail checking step of checking if transmission destination designated in electronic mail from the client computer is in compliance with the rule concerning relationship between transmission destination to be designated in electronic mail and attribute of a user to be designated as transmission destination of electronic mail, the rule being defined in advance; and an electronic mail transmitting step of sending the electronic mail from the client computer in accordance with a result of the check at the electronic mail checking step.

Yet further, at the electronic mail transmitting step, the electronic mail may be sent only to a user designated as transmission designation who is passed the check at the electronic mail checking step.

Yet further, at the electronic mail checking step, whether or not an attached file of the electronic mail from the client computer is in compliance with the rule concerning an attached file, which is defined in advance, is checked.

According to still another aspect of the present invention, there is provided an electronic mail system comprising the mail server described above.

In one embodiment of the present invention, the electronic mail system may further comprise user managing interface means for assigning identification information and a virtual password to a user who is allowed to use the electronic mail system within the company; and a user managing table for showing correlation between the identification information and the virtual password, both assigned by the user managing interface means, wherein the mail server further comprises password managing means for updating the password conversion table based on content of the user managing table.

Further, the password managing means may register elapsed time information to obtain elapsed time after new registration of a user's identification information in the password conversion table, in the password conversion table so as to be correlated to the user's identification information, and assigns a formal password to the user for the first time when the elapsed time information indicates lapse of a predetermined time.

According to yet another aspect of the present invention, there is provided, an electronic mail system in which mail servers are separately provided inside and outside a company, comprising the mail server described above as an inside company mail server which is installed inside the company where the client company is installed, and connected to a network inside the company; and another mail server as an outside company mail server which is installed outside the company.

Yet further, exchange of electronic mail within the company may be performed by the inside company mail server without using the outside company mail server, and exchange of electronic mail between inside and outside the company may be performed by the outside company mail server, to which the inside company mail server relays the electronic mail.

According to the present invention, upon receipt of a request from a user operating a client computer requesting mail addressed to them, the mail server retrieves mail data addressed to that user from their mailbox in another mail server, and sends the retrieved mail data, together with mail data retrieved from the mailbox in itself, to the client computer. This arrangement allows the user to receive all mail data addressed to them from all of their mailboxes by sending only one mail receiving request to one mail server.

Further, a virtual password, which differs from a formal password for user authentication by a mail server, is assigned to each user, and only the virtual password is provided to the user. Upon receipt of electronic mail or an electronic mail receiving request having the virtual password and addressed to an outsider, the mail server converts the virtual password into a corresponding formal password with reference to a password conversion table, and forwards the electronic mail or electronic mail receiving request to a concerned mail server. This arrangement allows the user to access an external mail server without the need of informing the user of his formal password. As a result, unauthorized or malicious use of an electronic mail system can be easily and reliably prevented.

Still further, provision of a virtual mail server function means enables electronic mail transmission within a company using a virtual password.

Yet further, unauthorized or malicious electronic mail or an inappropriate electronic mail transmission can be easily prevented with a simple structure.

Yet further, first assignment of a formal password not earlier than a lapse of a predetermined time after initial user registration enables more reliable security control.

Yet further, transmission destination rules and/or attached file rules are defined in advance to prevent unauthorized or malicious use of electronic mail, allowing transmission of only electronic mail in compliance with the rules transmission.

Yet further, a firewall is set so as to reject any access from outside and mail servers are separately provided inside and outside the company, so that thorough prevention of unauthorized access and exchange of electronic mail can be achieved at the same time.

DESCRIPTION OF PREFERRED EMBODIMENTS

In the following, preferred embodiments of the present invention are described with reference to the drawings.

Embodiment 1

Figure 1:
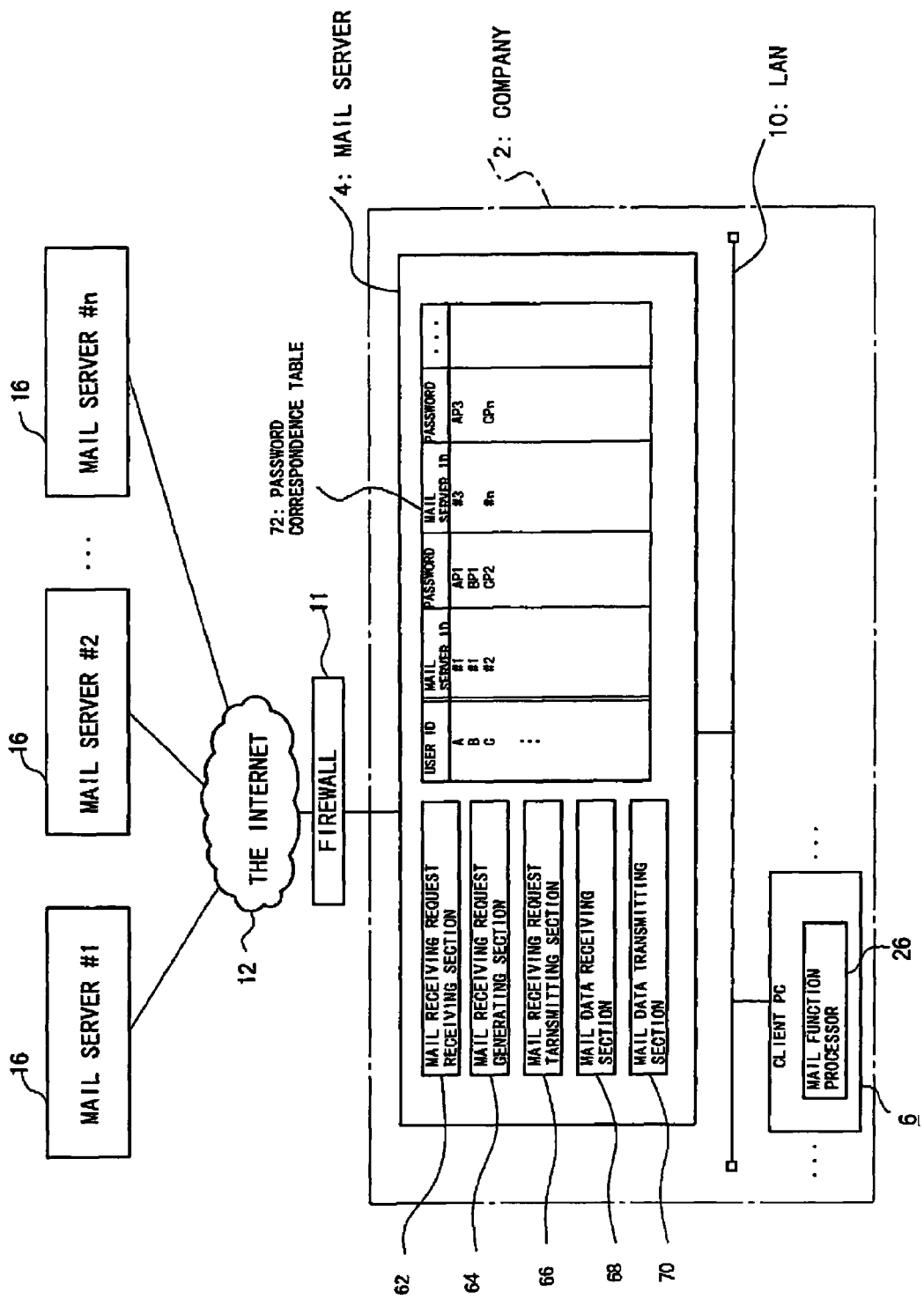
FIG. 1 is a block diagram showing a structure of an electronic mail system according to a first embodiment of the present invention.

FIG. 1 is a block diagram showing a structure of an electronic mail system according to a first embodiment of the present invention.

An office 2 has a mail server 4 and a plurality of client PCs 6, each connected to a LAN 10 installed throughout the office 2. The client PC 6 is a client computer used by an employee of the office 2 and equipped with a mail function processor 26 for the electronic mail system. The mail function processor 26 can be realized in general-purpose electronic mail application software installed in the client PC 6. The client PC 6 can access a mail server 16 through the LAN 10, the mail server 4, a firewall 11, and the Internet 12. A user of the client PC 6 has a personal mailbox in a mail server 16 outside the office 2, in addition to a mailbox in the mail server 4 inside the office 2, and, upon completion of user authentication by the respective mail servers 4 and 16, can retrieve mail data from the respective mailboxes which are respectively managed by the mail servers 4 and 16.

The mail server 4, which is a feature of this embodiment, has a mail receiving request receiving section 62, a mail receiving request generating section 64, a mail receiving request transmitting section 66, a mail data receiving section 68, a mail data transmitting section 70, and a password correspondence table 72, these elements 62 to 70 being described below in detail.

The password correspondence table 72 shows identification information (user ID) assigned to each user of a client PC 6, an identifier of a mail server 4 or 16 at which each user has a mailbox, and a password assigned to each user for user authentication by the mail server 4 or 16 at which that user has a mailbox, in the manner such that the latter two is correlated to the concerned user ID. That is, a password at the mail server 16 for use by a system administrator or each user is pre-registered in the password correspondence table 72.

This embodiment is characterized in that, upon receipt of a mail receiving request to the mail server 4 from a client PC 6 which requests receipt of mail data addressed to the client PC 6, the mail server 4 retrieves mail data addressed to the client PC 6 from relevant mailboxes in relevant mail servers 16 and sends the mail data retrieved from the mail servers 16, together with mail data retrieved from the mailbox in itself, to the requesting client PC 6. With this arrangement, the user can receive all of his mail data from all of his mailboxes by sending just one mail receiving request to the mail server 4.

Figure 2:
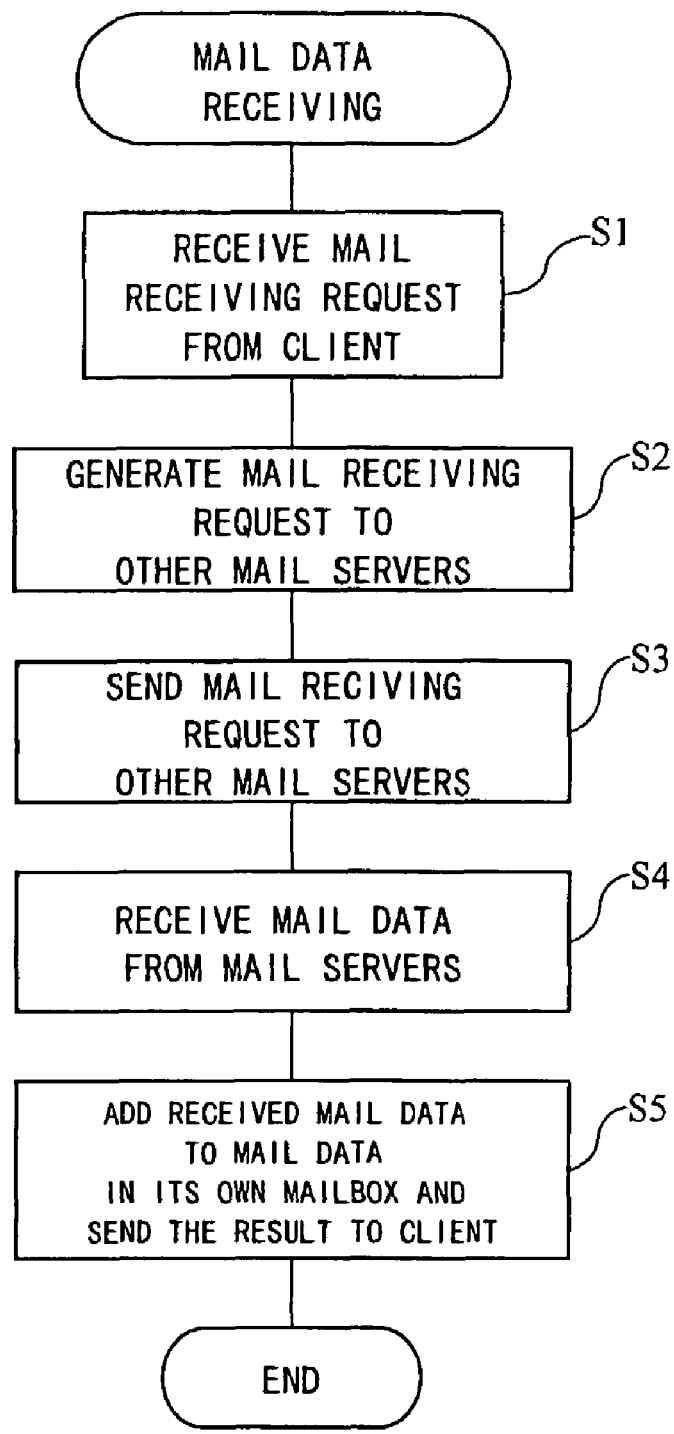
FIG. 2 is a flowchart of receiving electronic mail data in the first embodiment.

In the following, operation of the mail server 4 in this embodiment will be described with reference to the flowchart of FIG. 2.

A user of a client PC 6 sends a mail receiving request to a mail server 4, and the mail receiving request receiving section 62 receives the request (step 1). Upon receiving this request, the mail server 4 applies user authentication using a general-purpose POP server function. Thereafter, the mail receiving request generating section 64 specifies a mail server 16 on which the user having sent the mail receiving request received by the mail receiving request receiving section 62 has a mailbox, with reference to the password correspondence table 72, and generates a mail receiving request addressed to the specified mail server 16 on behalf of that user (step 2). That is, the mail receiving request generating section 64 attaches that user's user ID to the mail receiving request so that a mail receiving request similar to that which is originally sent from the user is resulted. The mail receiving request generating section 64 also adds a corresponding password known from the password correspondence table 72 to the created request so that the mail server 16 applies user authentication utilizing a POP server function. Then, the mail receiving request transmitting section 66 sends the resultant mail receiving request to each relevant mail server 16 (step 3).

The mail server 16 having received the mail receiving request from the mail server 4 applies user authentication using the user ID and password set on the received request, retrieves mail data from that user's mailbox, and sends it to the mail server 4. This operation by the mail server 16 is identical to that which would be applied when a mail receiving request is received directly from a user. Mail data may be, but is naturally not limited to, newly arrived electronic mail stored in a receiving tray. The type of mail data to be retrieved is determined based on the content of each mail receiving request.

Thereafter, the mail data receiving section 68 receives the mail data from the specified mail server 16 (Step 4), and the mail data transmitting section 70 adds the received mail data to mail data retrieved from that user's mailbox in the mail server 4 and sends the result to the client PC 6 (step 5).

As described above, the user can obtain mail data from all of his mailboxes by sending a mail receiving request only to a local mail server 4 in this embodiment. This is convenient because the user's operation to retrieve mail data from respective mail servers 16 can be omitted.

It should be noted that the respective elements 62 to 72 of the mail server 4 shown in FIG. 1, which are necessary to realize this embodiment, are not necessarily newly provided in order to realize this embodiment, and those which are generally provided to a mail server can be used.

Also, it should be noted that, whereas respective functions of the present invention are imparted to the mail server 4 inside the office 2 so that the mail server 4 serves as a mail server according to the present invention in the above, those functions may be imparted to one or a plurality of mail servers 16 external to the office 2.

Embodiment 2

Figure 3:
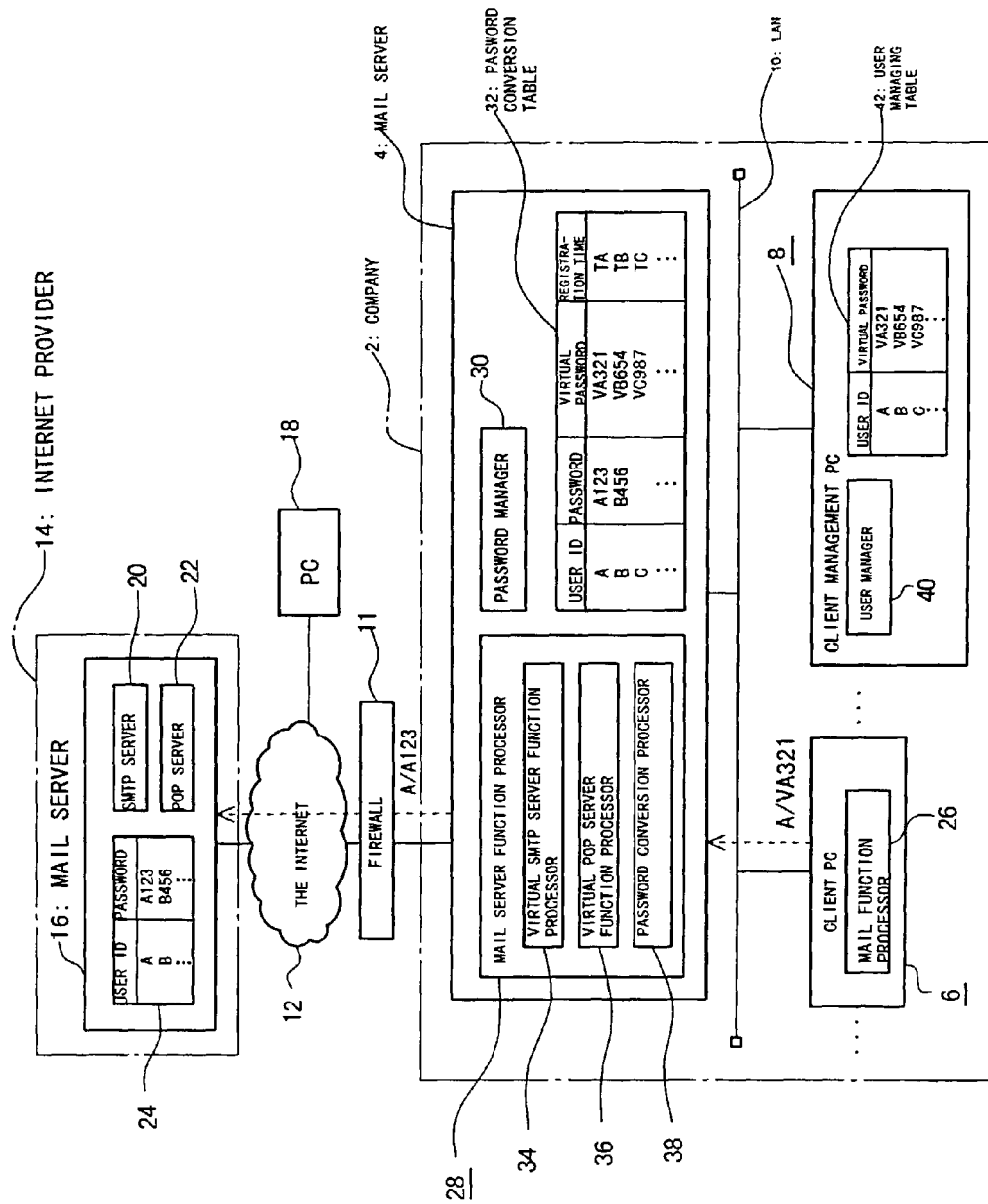
FIG. 3 is a block diagram showing a structure of an electronic mail system according to a second embodiment of the present invention.

FIG. 3 is a block diagram showing an electronic mail system according to a second embodiment of the present invention. In this figure, elements identical to those in FIG. 1 are given identical reference numerals and they are not described here. In the office 2, there are installed a mail server 4, a plurality of client PCs 6, and a client management PC 8, all connected to each other through a LAN 10 installed in the office 2. The client PC 6 can exchange electronic mail with a party outside the office 2 (an outsider) through the LAN 10, the mail server 4, the firewall 11, and the Internet 12, utilizing a mail server 16 in the Internet provider 14.

A mail server 16 in the Internet provider 14 has an SMTP server 20 and a POP server 22. The POP server 22 uses a user authentication table 24 for user authentication, while the SMTP server 20 uses it for checking user presence. It should be noted that the user authentication table 24 may be a user table which is generally possessed by an operating system, or OS, and that it is not necessary to provide any additional elements in the mail server 16 in order to realize this embodiment.

At a client PC 6 inside the office 2, a user can use an electronic mail function of an office intranet service of the office 2 when designating their identification information (hereinafter referred to as "user ID") and a virtual password, which are both assigned to each user by a system administrator. However, assignment of a user ID and a virtual password does not instantly mean permission of accessing all electronic mail functions in this embodiment. This will be described below.

The mail server 4, which is a feature of this embodiment, comprises a mail server function processor 28, a password manager 30, and a password conversion table 32. The password conversion table 32 shows a user ID assigned to each user, a formal password assigned to each user for user authentication by the mail server 16 using the user authentication table 24, a virtual password different from the formal password, and registration time, in a manner such that the latter three are correlated to the concerned user ID. The password manager 30 updates user information registered in the password conversion table 32.

The mail server function processor 28 has electronic mail transmission and reception functions attributing to SMTP and POP, which are inherent functions of the mail server 4. However, the mail server function processor 28 in this embodiment always first receives a mail server access request in electronic mail transmission or reception involving the client PC 6 and, should the access request be addressed to an outsider, converts the virtual password set on the access request to a corresponding formal password before relaying the access request to the mail server 16.

That is, exchange of electronic mail between a client user and an outsider is effected by the SMTP server 20 and the POP server 22 of the mail server 16. In this exchange, the mail server function processor 28 of the mail server 4 merely relays an access request. As described above, because there are some occasions in this embodiment where the mail server 4 does not actually use the original function of its SMTP and POP server functions but merely relays an access request, the SMTP and POP server functions of the mail server 4 are referred to as virtual SMTP and POP server functions here. These virtual SMTP and POP server functions are effected by a virtual SMTP server function processor 34 and a virtual POP server function processor 36, respectively. A password conversion processor 38 responsive to receipt of electronic mail sent from a client PC 6 and addressed to an outsider converts the virtual password set on the received electronic mail to its corresponding formal password with reference to the password conversion table 32.

A client management PC 8 is a client computer used by a system administrator of the office 2 and has a user manager 40 and a user managing table 42. The user manager 40 is responsible for user registration (assignment of a user ID and a virtual password to a user of an electronic mail system in the company, and so forth), user registration cancellation (deletion of user registration, and so forth), virtual password change, and so forth. A user managing table 42 shows correlation between a user ID and a virtual password, both assigned by the user manager 40.

This embodiment is characterized in that a virtual password is assigned to each user in addition to, and which differs from, a formal password which is assigned to each user for use in user authentication by the mail server 16, and that the user is informed of only the virtual password. This arrangement can easily and reliably prevent unauthorized or malicious use of electronic mail.

In the following, password management in this embodiment will be described.

In this embodiment, two kinds of passwords, namely a formal password and a virtual password, are assigned to each user. In this embodiment, a formal password corresponds to a password as is conventionally been used for user authentication by a mail server 16. The legend "password" in FIG. 3 refers to a formal password. A virtual password, on the other hand, is a password which is effective only within the office 2, that is, authenticated by the virtual SMTP and POP servers in the mail server function processor 28, but not by the mail server 16. In other words, a password which is not authenticated by the mail server 16, that is, a series of characters which is different from that of a formal password, must be set for a virtual password.

Updating of a virtual password will next be described.

To update a virtual password, the user manager 40 requests the mail server 4 to supply a pair of a user ID and a virtual password which is registered in the password conversion table 32. The user manager 40 having received the pair registers the pair in the user managing table 42, displays it on a screen using a commercially available spreadsheet program or the like so that the system administrator can update the displayed pair through operation via the screen, and updates the user managing table 42 accordingly.

Specifically, for initial registration of a user, the system administrator inputs a unique user ID and a virtual password for assignment to a user. The user manager 40 then newly registers the input user information in the user managing table 42.

For deletion of user information due to employee transfer, retirement, or any other reasons, the system administrator deletes the concerned user's record displayed on the screen, and the user manager 40 accordingly deletes the user information from the user managing table 42.

For changing of a virtual password, the system administrator changes a virtual password, displayed on the screen, which is correlated to the concerned user's user ID, and the user manager 40 accordingly changes the user's virtual password registered in the user managing table 42.

After such updating and subsequent saving by the system administrator by, for example, clicking a save button, and so forth, the user manager 40 sends all content of the user managing table 42 to the mail server 4.

Having received a table change request having the content of the user managing table 42 from the client management PC 8, the password manager 30 in the mail server 4 compares the received content of the user managing table 42 and the content of the password conversion table 32 to update the password conversion table 32, following the procedure described below.

That is, the password manager 30 sequentially reads out respective records constituting the content of the user managing table 42 provided from the client management PC 8, and processes these as follows.

For a user ID which is registered in both tables and for which the virtual passwords in both tables match, determination is made that the relevant user's information has not been updated, and the current information on that user is preserved as is without update. For a user ID which is registered in both tables and the virtual passwords of which do not match, determination is made that the relevant user's virtual password has been updated, and the virtual password registered in the table 32 is updated accordingly. For a user ID which is registered in the table 42 but not in the table 32, determination is made that the relevant user's information has been newly registered, and the pair of the relevant user's ID and virtual password is newly registered in the table 32, together with registration time, or a time at which this registration is made. It should be noted that, in new registration, a formal password is not registered, as shown for user ID "C" in FIG. 3. For a user ID which is not registered in the table 42 but in the table 32, determination is made that the relevant user's information has been deleted, and his information is deleted from the password conversion table 32.

Next, registration of a formal password will be described.

Generally, new registration of a user ID is required for a person who has just joined the office 2. In a case where the office 2 is a company, an employee who has just been assigned with a user ID may be a new employee. As a new employee, that person may not yet have established his credibility in the company at the time his information is being registered in the password conversion table 32. Granting such a person unconditional permission to send electronic mail to an outsider may possibly cause a problem in view of security management. However, if a mail account is not assigned to a new employee, that person will be unable to exchange electronic mail even within the company.

In view of the above, in this embodiment, a virtual password is assigned to a new user, but a formal password necessary for electronic mail exchange with an outsider is not assigned until the new employee establishes his credibility to some extent in the company, such as after the lapse of a predetermined length of employment. It is assumed in this embodiment that required credibility is established in the lapse of a predetermined time after registration of a user ID and a virtual password in the password conversion table 32, and a formal password is then assigned to that person for the first time.

Assuming that the predetermined employment period is one month after new registration, the password manager 30, which resides in a memory for periodical operation, compares a registration time registered in the password conversion table 32 and the present time. When the lapse of one month is determined, the password manager 30 creates a formal password for that user and registers it in the password conversion table 32. Moreover, the password manager 30 sends the created formal password to the mail server 16 for registration in the user authentication table 24.

In this embodiment, it is determined that a formal password is to be issued after the lapse of a predetermined period after new registration and a registration time is registered in the password conversion table 32 as elapsed time information to be referred to in knowing the lapse of time after new registration. Alternatively, output of a counter, such as a day counter, may be used as elapsed time information. Also, whereas it is assumed in this embodiment that a user's credibility will be established in the lapse of a predetermined time, the point of establishment of credibility may be desirably determined, for example, such as upon completion of on-the-job training, or OJT, according to the company's operation. A formal password may be manually assigned to an individual employee, and assigned immediately after new registration with the predetermined time 0.

As described above, some users may not yet have been assigned a formal password, as shown in the password conversion table 32 of FIG. 3.

Figure 4:
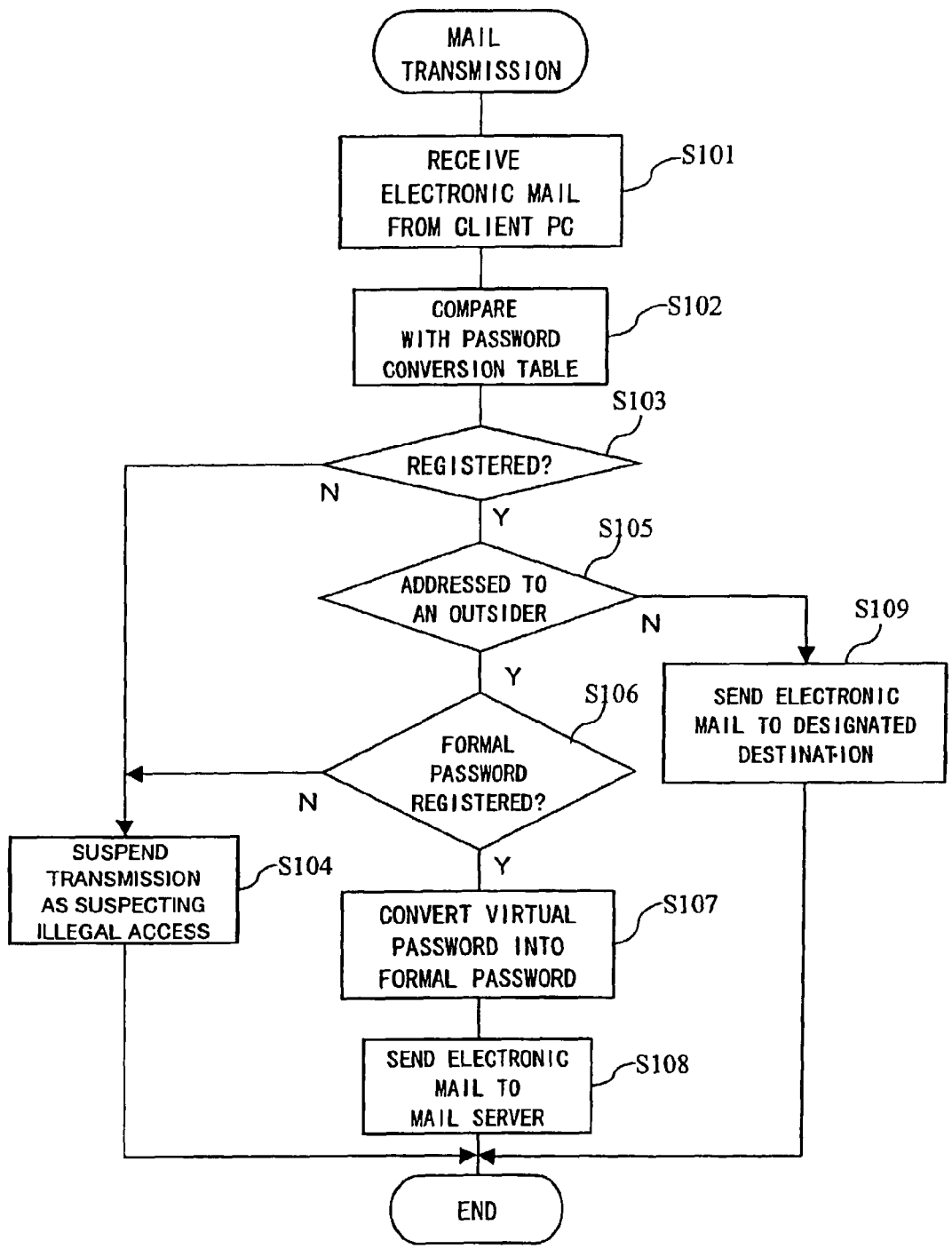
FIG. 4 is a flowchart of transmission of electronic mail data in the second embodiment.

In the following, electronic mail transmission in this embodiment will be described with reference to the flowchart of FIG. 4, based on the assumption that those records shown in the user authentication table 24, the password conversion table 32, and the user managing table 42 in FIG. 3 are already registered.

In an example wherein an employee of the office 2, or a user, attempts to send electronic mail addressed to an outsider from the client PC 6, the mail function processor 26 sends this mail as an access request relative to the mail server 16. For brevity of explanation, this mail is assumed to designate one transmission destination. Here, in attempt of sending electronic mail, the user designates his virtual password, which is assigned to him by the system administrator and informed in advance, in order to use an electronic mail function. A user may be asked to input a user ID and a virtual password for attachment to electronic mail when using the electronic mail function, or a user ID and a password which the user inputs when logging in the client PC 6 may be used intact as a user ID and a virtual password for attachment. No specific method for setting a user ID and a virtual password, which are indispensable in use of an electronic mail function, is specified in this embodiment.

The mail server function processor 28 of the mail server 4 receives electronic mail from the client PC 6 prior to a mail server 16 (step 101). When received electronic mail has a virtual password and is addressed to an outsider, the POP server, that is, the virtual POP server function processor 36, applies user authentication since the SMTP server, which has a mail transmission function and checks presence of the user who sent the electronic mail, does not have a user authentication function, and only an authenticated user can send the electronic mail according to SMTP. Specifically, the virtual POP server function processor 36 checks if the pair of the user ID and the virtual password set on the received electronic mail is registered in the password conversion table 32 (step 102). If not, the mail server function processor 28 determines an attempt of unauthorized access to the mail server 16, rejects electronic mail transmission, notifies the sender of the rejection (steps 103, 104). Information on this unauthorized access event is recorded in a log file (not shown), and so forth, for effective security control. The sender is notified of unauthorized access but not fed with its original mail. A mail administrator may also be notified of the unauthorized event for optional setting.

If the pair is found registered in the password conversion table 32 at step 103, on the other hand, the mail server function processor 28 then determines if any outsider is designated as an addressee, including any designating CC or BCC recipients (step 105). When the determination is yes, the mail server function processor 28 then determines if a corresponding formal password is registered in the password conversion table 32 (step 106). When the determination is no, as with user ID "C" shown in FIG. 3, possible illegality is suspected with that electronic mail transmission to an outsider, and the concerned electronic mail is rejected, which is informed to the sender (step 104). This event of unauthorized access is recorded in a log file (not shown), and so forth. The sender is notified of unauthorized electronic mail but not fed with its original mail. A mail administrator may also be notified of the unauthorized electronic mail for optional setting.

At step 106, when a formal password is registered in the password conversion table 32, the password conversion processor 38 converts the virtual password set on the received electronic mail to a corresponding formal password with reference to the password conversion table 32 (step 107). For example, for appropriate electronic mail from user ID "A", the password conversion processor 38 converts the attached virtual password, or "VA321", into a corresponding formal password "A123". Subsequently, the virtual SMTP server function processor 34 first accesses the POP server 22 of the mail server 16 for user authentication using the user ID and the formal password, and then sends the electronic mail to the mail server 16 (step 108). In the user authentication, the POP server 22 allows that user access to the mail server 16 because the informed password matches the password registered in the user authentication table 24.

At step 105, when only a party inside the office 2 (an insider) is designated as an addressee, including all CC or BCC recipients, in the received electronic mail, the virtual SMTP server function processor 34 forwards the electronic mail as it bears a virtual password to the designated destination without sending the electronic mail to the mail server 16 (step 109).

As described above, in this embodiment, the mail server 4 performs its inherent function as a mail server to distribute electronic mail addressed to an insider. That is, because a formal password is unnecessary for electronic mail transmission within the office 2, even a user who has not yet been assigned with a formal password can exchange mail within the office 2.

Next, reception of electronic mail in this embodiment will be described, in which basic password conversion by the mail server function processor 28 in the mail server 4 is identical to that for mail transmission. That is, when a user who works in the office 2 wishes to receive electronic mail addressed to himself from the mail server 16, the mail function processor 26 sends an electronic mail receiving request having the user's user ID and virtual password to the mail server 16, and the virtual POP server function processor 36 applies user authentication based on the attached user ID and virtual password. When the pair of that user's user ID and virtual password is not registered in the password conversion table 32 or when an associated formal password is not registered in the table 32 even if the pair is registered, that access request is rejected and the rejection is notified to the sender of the electronic mail receiving request.

Meanwhile, when a formal password is registered, the password conversion processor 38 converts the virtual password into the formal password, and the virtual POP server function processor 36 sends an electronic mail receiving request having that user's user ID and formal password to the mail server 16. The mail server 16 authenticates the user because the password set on the request is identical to the password registered in the user authentication table 24, whereby that user is allowed to access the mail server 16. Thereafter, in downloading of electronic mail to the client PC 6, the mail server function processor 28, which then relays the electronic mail from the mail server 16, converts the formal password set on the received electronic mail into a corresponding virtual password with reference to the password conversion table 32.

As described above, in this embodiment, electronic mail transmission and reception for unauthorized purposes can be prevented in advance, and a system administrator need only perform a simple input operation to set and register a unique user ID and a virtual password in order to complete system setting which allows its users to use an electronic mail function. That is, in this embodiment, a system administrator need not perform any complicated setting in order to prevent unauthorized access. From a system administrator's point of view, the required task is no more complicated than listing system users. Virtual password change and user registration deletion can be made through simple input operation, as described above. It should be noted that, although a commonly available software, such as a spreadsheet program, is used for setting a user ID and a virtual password in this embodiment, a setting method is not limited thereto.

Further, this embodiment in which electronic mail exchange with an outsider is achieved without informing a user of a formal password to be used by a mail server 16 can provide advantages such as that in the following example.

For example, when a user who works for the office 2 attempts to access a mail server 16 from an external PC 18 for an unauthorized, nefarious, or malicious purpose such as stealing of information or the like, a user having user ID "A", for example, knows only a virtual password "VA321" but not a formal password "A123", and he thus cannot access the mail server 16 from outside using the virtual password "VA321" because the mail server 16 does not allow access from an outside PC 18 using a virtual password "VA321", though he can access the mail server 16 from inside the office 2 using the virtual password "VA321", as described above. That is, no user without the knowledge of a formal password can access the mail server 16 from an outside PC 18, being unable to apply either mail transmission or reception of electronic mail addressed to himself. In fact, the user with user ID "A" has no knowledge about the location of the mail server 16, and thus cannot even attempt access to the mail server 16.

As described above, because access from outside the office 2 to the mail server 16 can be prevented in this embodiment, security can be ensured.

Here, the mail servers 16 are located outside the office 2 in the above description of this embodiment. Alternatively, the mail servers 16 may be installed inside the office and connected to the LAN 10. With this arrangement, control must be made such that electronic mail from a client PC 6 is routed to the mail server 16 by way of the mail server 4.

Although such an arrangement is acceptable solely in view of using double passwords, namely, a virtual password and a forward password, the mail server 16 is nevertheless located outside the office 2 in this embodiment in order to defend against external virus attacks and so forth.

In this embodiment, a firewall 11 is formed between the Internet 12 and the office intranet in order to prevent unauthorized access from outside. If mail servers 16 are located inside the office and the firewall 11 is maintained in portless status which rejects any access from outside, unauthorized access from outside to the electronic mail system in the office 2 can be completely cutout. With a firewall 11 in a portless status, the electronic mail system in the office 2 cannot be accessed even the existence of the system cannot be determined.

Such a structure, however, does not allow the mail server 16 to receive electronic mail from outside. Therefore, in this embodiment, while the firewall 11 is maintained in a portless state, the mail server 16 is installed outside the office 2, and the mail server 4, which includes the mail server function processor 28 for relaying an access request, is installed inside the office 2, as shown in FIG. 3.

With this structure, exchanged of electronic mail inside the office 2 can be realized using the mail server 4 without intervention by the mail server 16, and electronic mail exchanging between an insider and an outsider can be effected by the mail server 16 with the mail server function processor 28 merely converting passwords and relaying the received electronic mail. That is, electronic mail from outside is received by the mail server 16 without passing through the firewall 11. Although an inside addressee must access the mail server 16 outside the office 2 to fetch electronic mail, the firewall 11 lets the insider's access pass through without any problem. While this arrangement allows transmission of electronic mail from inside the office, it allows no access from outside to pass through the firewall 11, as described above.

Because the firewall 11 is set so as to allow no access from outside and electronic mail server functions are separately provided inside and outside the office 2 in this arrangement, thorough prevention of unauthorized access and exchange of electronic mail can be achieved at the same time. It should be noted that double passwords may not be indispensable in view of defending from external virus attacks.

Here, an insider and an outsider can be designated as addressees and/or CC and/or BCC recipients in a single electronic mail. Treatment of such a mail may be determined on an operation basis, for example, such a mail may not be delivered to any destination or may be delivered to only an addressed insider, and so forth.

In this embodiment, a client managing PC 8 is provided which has the user manager 40 and the user managing table 42. Alternatively, the user manager 40 and the user managing table 42 may be realized using WWW function. In such a case, these functions can be realized in the client PC 6 without requiring the client managing PC 8.

The access request relaying function, which is a feature of this embodiment, can be realized utilizing the elements of the first embodiment. In this case, some elements may be commonly used for the features of the first embodiment and those of this embodiment, for example, the password conversion table 32 in this embodiment and the password correspondence table in the first embodiment may be provided as a single unit.

Alternatively, the structure of this embodiment can be provided separately from that of the first embodiment. In such a case, for example, elements necessary for relaying an access request to an external mail server 16, namely, the mail server function processor 28, the password manager 30, and the password conversion table 32, are not necessarily provided to the mail server 4, but may be provided to a general-purpose server, an electronic mail communication control device, or the like. The POP protocol may be an APOP, which is superior in security.

Embodiment 3

Figure 5:
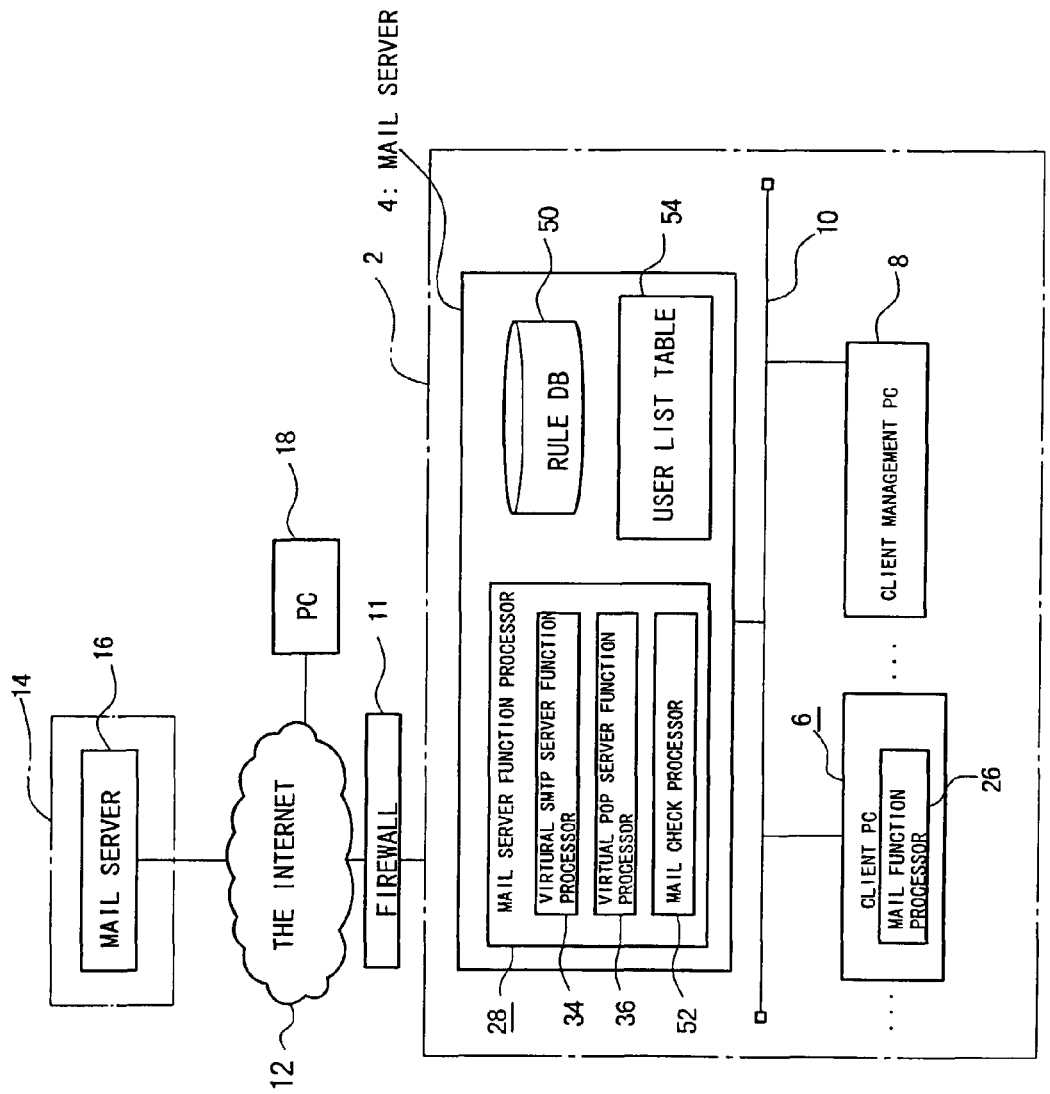
FIG. 5 is a block diagram showing a structure of an electronic mail system according to a third embodiment of the present invention.

FIG. 5 is a block diagram showing a structure of an electronic mail system according to the third embodiment of the present invention, in which identical elements to those in the second embodiment are given identical reference numerals and not described here. The drawing shows only elements which are referred to in the following description on the characteristic operation of this embodiment. Nevertheless, it should be noted that the system of this embodiment can be constructed utilizing the elements of the first and/or second embodiments.

As shown in FIG. 5, this embodiment is characterized by a rule database (DB) 50, a mail check processor 52, and a user list table 54. The rule DB 50 stores a rule which defines correlation between electronic mail transmission destination (an addressee, CC, BCC) and attributes of a user to be designated as electronic mail transmission destination. The mail check processor 52 checks if the transmission destination designated in received electronic mail from the client PC 6 is in compliance with a rule stored in the rule DB 50. The user list table 54 shows a registered list of users of this system in the office 2, that is, employees in the office 2. When this embodiment is realized utilizing some elements in the second embodiment, for example, the password conversion table 32 in the second embodiment can be utilized. That is, the user ID list in the password conversion table 32 can be used as the user list in this embodiment.

In this embodiment, pre-defining of a security rule can facilitate maintenance of security. Not only security rules but also business rules suitable for the operation of an electronic mail system in the office 2 may be registered in the rule DB 50 to facilitate construction of appropriate environment for an electronic mail system of the office 2.

In the following, example rules registered in the rule DB 50 will be described with reference to an operational example.

Transmission destination rules may include restriction conditions as to whether or not to distribute electronic mail from a client PC 6 to its designated transmission designation. For example, primary addressees and CC recipients must be insiders of the office 2; no larger than six total outsiders can be designated as primary addressees and CC recipients; no outsider can be a BCC recipient; a mailing list can be designated only as a BCC recipient, and so forth.

Attached file rules may include restriction conditions as to type or size of an attached file. For example, no mailing list can be attached; a file having a larger than a predetermined data volume cannot be attached, and so forth.

Combination of transmission destination rules and attached file rules may define, for example, transmission of electronic mail with larger than a predetermined total data volume for a single transmission is not allowed. For example, assuming that the predetermined volume is 5 MB, electronic messages having a 1 MB attached file and addressed to six users do not comply with this rule.

These rules registered in the rule DB 50 are predefined in and supplied from the client management PC 8 or the mail server 4. The maximum number of parties designable as recipients is desirably determined depending on the system size and/or operation. In this embodiment, a rule defining image (not shown) is provided to facilitate defining of rules as exemplified above by a system administrator.

In the following, electronic mail transmission in this embodiment will be described.

Electronic mail from a client PC 6 is received in the mail server function processor 28 in the mail server 4. The mail check processor 52 checks if the designated transmission destination and an attached file of the received electronic mail are in compliance with the rule stored in the rule DB 50 in view of, for example, the number of designated destination parties, discrimination between insiders and outsiders as recipients, and so forth. Discrimination between insiders and outsiders is made based on if the party is registered or not in the user list table 54. Further, type, size, and so forth of an attached file are checked, and a total transmission data volume is calculated to see if it is in compliance with a predetermined condition. Checking the total transmission data volume can prevent an extreme increase of a network load due to transmission of electronic mail.

When as a result of these checks it is determined that the received electronic mail violates the rule, the mail server function processor 28 suspends distribution of the electronic mail and records the violation in a log file (not shown) and so forth. A violating electronic mail is basically not distributed to any destination to avoid complication of processing. Alternatively, such electronic mail may be sent only to a recipient which is determined by the mail server function processor 28 as being in compliance with the rule, while excluding a violating party from its destination. For this purpose, for example, an outsider designated under BB may be automatically deleted. Still alternatively, violation may be corrected according to the restriction condition and the corrected electronic mail is transmitted accordingly. For this purpose, for example, a mailing list, if designated as a primary addressee, may be readdressed as a BCC recipient.

In general business practice, it is unlikely that many outsiders would be designated as transmission destination of electronic mail. Transmission of electronic mail having a mailing list attached thereto may not be considered as a normal procedure. Such destination designation and/or file attachment may be highly likely an attempt of using an electronic mail system for a purpose other than business operation or even information leakage. A system configured according to this embodiment can prevent such electronic mail transmission which may be considered problematic in view of security management. In particular, pre-registration of rules in the rule DB 50 can prevent mail transmission assumed to be sent for a nefarious purpose.

In the above described respective embodiments, unauthorized or malicious use of an electronic mail function can be prevented. Moreover, only a simple operation including setting a user ID and a virtual password and definition of rules is required to achieve security control. Therefore, combination of the system structures and functions of the these embodiments and introduction of the combination as infrastructure of an office network system can facilitate construction of environment for the electronic mail system in which unauthorized or malicious use of the electronic mail system can be prevented. This makes it possible for small companies, which often have limited monetary and human resources, to put in place sufficient security measures.

It should be noted that registration of user attributes including not only the state of being an employee of the office 2, as described above, but also department, title, data of joining, and so forth, in the user list table 54 enables a finer level of transmission control according to the rules.

Further, the embodiments of the present invention can be applied not only by small companies, as is the original aim of the present invention, but by large companies as well.

What is claimed is:

1. A mail server, comprising:
  a password correspondence table showing registered correlation between identification information including a virtual password assigned to a user of a client computer and a formal password assigned to the user for user authentication by another mail server on which the user has a mailbox;
  mail receiving request receiving means for receiving a mail receiving request sent from a client computer and authenticating the mail receiving request based on a virtual password;
  mail receiving request generating means for specifying, upon receipt and authentication of a mail receiving request by the mail receiving request receiving means, the another mail server on which a user having sent the received mail receiving request has a mailbox, with reference to the password correspondence table to generate a mail receiving request that includes a formal password relative to the another mail server on behalf of the user;
  mail receiving request transmitting means for sending the mail receiving request generated by the mail receiving request generating means to the another mail server;
  mail data receiving means for receiving mail data which is sent in response to the mail receiving request sent by the mail receiving request transmitting means; and
  mail data transmitting means for adding the mail data received by the mail data receiving means to mail data retrieved from a mailbox possessed by itself to send resultant mail data to the client computer.

2. The mail server according to claim 1, wherein
the mail receiving request generating means adds the formal password assigned to the user to the mail receiving request to be generated.

3. An electronic mail transmission control method for a mail server, comprising:
receiving a first mail receiving request sent from a client computer;
authenticating the mail receiving request based on a virtual password;
specifying a mailbox at another mail server based on the mail receiving request and a password correspondence table that correlates the virtual password with a formal password of the mailbox at the another mail server;
generating a second mail receiving request for the another mail server that corresponds to the first mail receiving request;
sending the second mail receiving request to the another mail server;
receiving mail data which is sent by the another mail server in response to the second mail receiving request; and
adding the mail data to mail data retrieved from a mailbox possessed by the mail server to send to the client computer.

4. The electronic mail transmission control method according to claim 3, wherein, the formal password is added to the second mail receiving request.

5. The mail server according to claim 1, further comprising:
a password conversion table that shows a registered correlation among identification information assigned to a user of the client computer installed in a company where the mail server is installed, the formal password assigned to the user for user authentication by the another mail server, and the virtual password different from the formal password and assigned to the user;
mail server function means for relaying an access request relative to the another mail server, sent from the client computer; and
password conversion means for converting a virtual password in the access request received by the mail server function means into the formal password with reference to the password conversion table,
wherein the mail server function means replaces the virtual password in the access request with the formal password to generate a converted access request and then sends the converted access request to the another mail server.

6. The mail server according to claim 5, wherein
when relaying electronic mail from the client computer to the another mail server, the mail server function means replaces a virtual password associated with the electronic mail with the formal password into which the virtual password is converted by the password conversion processing means.

7. The mail server according to claim 6, wherein
the mail server function means sends electronic mail which is addressed solely to an insider of the company to its designated transmission destination, the electronic mail is not relayed to the another mail server, and the virtual password is not converted to the formal password.

8. An electronic mail system comprising the mail server according to claim 5.

9. The electronic mail system according to claim 8, further comprising:
user managing interface means for assigning identification information and a virtual password to a user who is allowed to use the electronic mail system within the company; and
a user managing table for showing correlation between assigned identification information and assigned virtual password, both assigned by the user managing interface means,
wherein the mail server further comprises password managing means for updating the password conversion table based on content of the user managing table.

10. The electronic mail system according to claim 9, wherein
the password managing means registers elapsed time information to obtain an elapsed time after a new registration of a user's identification information in the password conversion table, so as to be correlated to the user's identification information, and assigns a formal password to the user for the first time when elapsed time information indicates lapse of a predetermined time.

11. The electronic mail transmission control method for a mail server according to claim 3, further comprising:
receiving a first access request which is sent from the client computer installed in a company where the mail server is installed and has a virtual password which is different from a formal password assigned to a user for user authentication by the another mail server;
converting the virtual password in the first access request into the formal password, based on identification information of the user; and
replacing the virtual password in the first access request with the formal password into which the virtual password is converted for sending a second access request, which includes the formal password, to the another mail server.

12. The electronic mail transmission control method for a mail server according to claim 11, wherein
when an electronic mail is addressed to an insider of the company, the electronic mail is sent to its transmission destination, the electronic mail is not sent to the another mail server, and the virtual password is not converted to the formal password.

13. The mail server according to claim 1, comprising:
a rule database storing a rule concerning relationship between transmission destination to be designated in electronic mail and an attribute of a user to be designated as transmission destination of electronic mail;
electronic mail checking means for checking if a transmission destination designated in electronic mail sent from the client computer is in compliance with the rule stored in the rule database; and
electronic mail transmitting means for sending the electronic mail from the client computer in accordance with a result of the check by the electronic mail checking means.

14. The mail server according to claim 13, wherein
the rule database stores a rule concerning an attached file, and
the electronic mail checking means checks if an attached file of electronic mail from the client computer is in compliance with the rule stored in the rule database.

15. The electronic mail transmission control method for a mail server according to claim 3, further comprising:
checking if transmission destination designated in an electronic mail from the client computer is in compliance with a rule concerning relationship between transmission destination to be designated in the electronic mail and an attribute of a user to be designated as transmission destination of the electronic mail, the rule being defined in advance; and
sending the electronic mail from the client computer in accordance with a result of the electronic mail checking step.

16. The electronic mail transmission control method for a mail server according to claim 15, wherein
the electronic mail is sent only to a user designated as transmission designation who passed the electronic mail checking step.

17. The electronic mail transmission control method for a mail server according to claim 15, further comprising:
checking whether or not an attached file of the electronic mail from the client computer is in compliance with a rule concerning an attached file, which is defined in advance.

18. An electronic mail system in which mail servers are separately provided inside and outside a company, comprising:
the mail server according to claim 1 as an inside company mail server which is installed inside the company where the client computer is installed, and connected to a network inside the company; and
another mail server as an outside company mail server which is installed outside the company.

19. The electronic mail system according to claim 18 wherein
exchange of electronic mail within the company is performed by the inside company mail server without using the outside company mail server, and
exchange of electronic mail between inside and outside the company is performed by the outside company mail server, to which the inside company mail server relays the electronic mail.

20. A mail server, comprising,
a mail receiving request receiving unit that receives a mail receiving request sent from a client computer;
a mail receiving request generating unit that generates a mail receiving request for another mail server on which a user having sent a received mail receiving request has a mailbox;
a mail receiving request transmitting unit that sends a mail receiving request generated by the mail receiving request generating unit to the another mail server;
a mail data receiving unit that receives mail data which is sent in response to the mail receiving request sent by the mail receiving request transmitting unit; and
a mail data transmitting unit that adds the mail data received by the mail data receiving unit to mail data retrieved from a mailbox possessed by the mail server itself to send resultant mail data to the client computer.

* * * * *